United States Patent
Rice et al.

(10) Patent No.: US 6,494,948 B2
(45) Date of Patent: Dec. 17, 2002

(54) PREPARATION OF QUINACRIDONE PIGMENT COMPOSITIONS

(75) Inventors: Daphne J. Rice, Charleston, SC (US); Ibraheem T. Badejo, Morrisville, NC (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/747,465

(22) Filed: Dec. 22, 2000

(65) Prior Publication Data

US 2002/0078860 A1 Jun. 27, 2002

(51) Int. Cl.[7] ............................................. C09B 48/00
(52) U.S. Cl. ..................... 106/497; 106/494; 106/495; 546/49; 546/56
(58) Field of Search .................... 106/494, 495, 106/497; 546/49, 56

(56) References Cited

U.S. PATENT DOCUMENTS

| | | | |
|---|---|---|---|
| 3,157,659 A | 11/1964 | Deuschel et al. | 260/279 |
| 3,256,285 A | 6/1966 | Fuchs et al. | 260/279 |
| 3,257,405 A | 6/1966 | Gerson et al. | 260/279 |
| 3,265,699 A * | 8/1966 | Jaffe | 106/497 |
| 3,317,539 A | 5/1967 | Jaffe | 260/279 |
| 4,100,162 A * | 7/1978 | North | 106/497 |
| 4,455,173 A * | 6/1984 | Jaffe | 106/495 |
| 4,758,665 A * | 7/1988 | Spietschka et al. | 106/497 |
| 4,844,742 A * | 7/1989 | Jaffe | 106/448 |
| 4,895,948 A * | 1/1990 | Jaffe et al. | 546/56 |
| 4,895,949 A * | 1/1990 | Jaffe et al. | 546/49 |
| 5,368,641 A | 11/1994 | Dietz et al. | 106/495 |
| 5,457,203 A | 10/1995 | Hendi et al. | 546/56 |
| 5,683,502 A | 11/1997 | Badejo et al. | 106/495 |
| 5,713,999 A | 2/1998 | Badejo et al. | 106/495 |
| 5,755,873 A | 5/1998 | Badejo et al. | 106/497 |

OTHER PUBLICATIONS

S.S. Lanbana and L.L. Labana, "Quinacridones" in Chemical Reviews, 67, 1–18 Jan. 25, 1967.
W. Herbst and K. Hunger, Industrial Organic Pigiments, 2nd ed. (NY: VCH Publishers, Inc., (Month unavailable) 1997, pp. 454–459, Quinacridone Pigments.

* cited by examiner

Primary Examiner—Anthony J. Green
(74) Attorney, Agent, or Firm—Joseph C. Gil; Richard E. L. Henderson; Thomas W. Roy

(57) ABSTRACT

This invention relates to a process for preparing quinacridone pigment compositions by
(a) heating a reaction mixture containing
  (i) 2,5-dianilinoterephthalic acid or 2,5-dianilino-6,13-dihydroterephthalic acid or a derivative thereof,
  (ii) about 0.1 to about 5 percent, based on component (a)(i), of 2,5-di(sulfamoylanilino)terephthalic acid and/or 2,5-di(sulfamoylanilino)-6,13-dihydroterephthalic acid or a derivative thereof,
  (iii) about 0.1 to about 15 percent by weight, based on component (a)(i), of other sulfonyl-containing derivatives of 2,5-dianilinoterephthalic acid and/or 2,5-dianilino-6,13-dihydroterephthalic acid,
  (iv) about 3 to about 20 parts by weight, per part of component (a)(i), of a dehydrating agent, and
  (v) optionally, a solvent;
(b) drowning the reaction mixture from step (a) with a liquid in which the quinacridone pigment composition is substantially insoluble; and
(c) isolating the quinacridone pigment composition.

13 Claims, No Drawings

PREPARATION OF QUINACRIDONE PIGMENT COMPOSITIONS

BACKGROUND OF THE INVENTION

This invention relates to a process for the preparation of quinacridone pigment compositions in the presence of mixtures of certain sulfonyl-containing derivatives of 2,5-dianilinoterephthalic acid.

Processes for the preparation of quinacridone are known. E.g., S. S. Labana and L. L. Labana, "Quinacridones" in *Chemical Review*, 67, 1–18 (1967); W. Herbst and K. Hunger, *Industrial Organic Pigments*, 2nd ed. (New York: VCH Publishers, Inc., 1997), pages 454–459; and U.S. Pat. Nos. 3,157,659, 3,256,285, and 3,317,539. The quinacridones thus obtained, known as crude quinacridones, are generally unsuitable for use as pigments and must undergo one or more additional finishing steps to modify the particle size, particle shape, or crystal structure to achieve pigmentary quality. For example, in a preferred method for preparing quinacridones, certain 2,5-dianilinoterephthalic acid precursors are thermally ring closed in the presence of polyphosphoric acid. E.g., U.S. Pat. No. 3,257,405. After ring closure is complete, the melt is drowned by pouring into a liquid in which the quinacridone is insoluble, usually water and/or an alcohol, after which the resultant crystalline pigment is typically further conditioned by solvent treatment and/or milling.

The addition of certain quinacridone derivatives or their precursors to the ring-closure step has been reported to enhance the coloristic and rheological properties of quinacridone pigments. For example, U.S. Pat. No. 5,368,641 discloses the use of various quinacridone derivatives in the manufacture of 2,9-dimethylquinacridone, U.S. Pat. No. 5,457,203 describes the use of quinacridone derivatives during the oxidation of dihydroquinacridone (prepared from 2,5-dianilino-3,6-dihydroterephthalic acid) to quinacridone, and U.S. Pat. Nos. 5,683,502 and 5,713,999 disclose the manufacture of quinacridone pigments in the presence of compounds other than quinacridones.

U.S. Pat. No. 5,755,873 describes the preparation of quinacridone pigments by ring closure of the corresponding dianilinoterephthalic acid precursors in the presence of various substituted dianilinoterephthalic acid derivatives, including 2,5-di(sulfamoylanilino)terephthalic acid. Although the resultant quinacridone pigment compositions typically exhibit improved coloristic and rheological properties, the quinacridone derivative that forms when using 2,5-di(sulfamoylanilino)terephthalic acid has an undesirable tendency to bleed from the resultant pigment preparations, which can adversely affect their use.

It has now been found that quinacridone pigment compositions exhibiting an advantageous combination of coloristic and rheological properties without excessive bleeding associated with 2,5-di(sulfamoylanilino)terephthalic acid can be obtained by using reduced quantities of 2,5-di(sulfamoylanilino)terephthalic acid in combination with other sulfonyl-containing derivatives of 2,5-dianilinoterephthalic acid during quinacridone synthesis.

SUMMARY OF THE INVENTION

The present invention relates to a process for the preparation of quinacridone pigment compositions comprising
(a) heating, at a temperature of about 80° C. to about 145° C. (preferably 95° C. to 130° C.) (preferably for about one to about 24 hours), a reaction mixture comprising (i) 2,5-dianilinoterephthalic acid or 2,5-dianilino-6,13-dihydroterephthalic acid or a derivative of 2,5-dianilinoterephthalic acid or 2,5-dianilino-6,13-dihydroterephthalic acid having one or more substituents other than sulfonyl groups in at least one aniline ring, a salt or ester thereof, or a mixture thereof, (ii) about 0.1 to about 5 percent by weight (preferably 1 to 3 percent by weight), based on component (a)(i), of a 2,5-di(sulfamoylanilino)terephthalic acid having the formula (I)

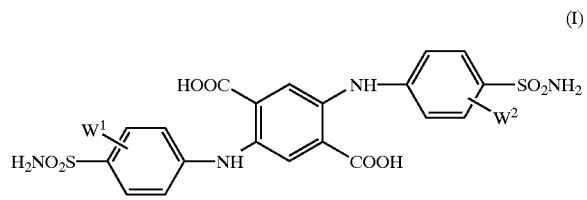

(I)

and/or a 2,5-di(sulfamoylanilino)-6,13-dihydroterephthalic acid having the formula (I')

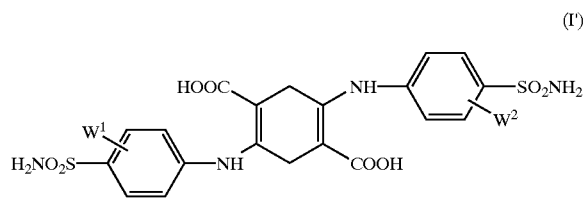

(I')

wherein $W^1$ and $W^2$ are independently hydrogen, halogen, $C_1$–$C_6$ alkyl, or $C_1$–$C_6$ alkoxy, (iii) about 0.1 to about 15 percent by weight (preferably 5 to 10 percent by weight), based on component (a)(i), of one or more sulfonyl-containing derivatives of 2,5-dianilinoterephthalic acid having the formula (II)

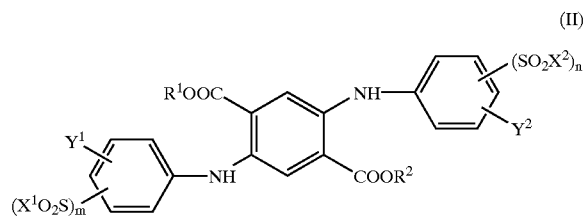

(II)

and/or one or more sulfonyl-containing derivatives of 2,5-dianilino-6,13-dihydroterephthalic acid having the formula (II')

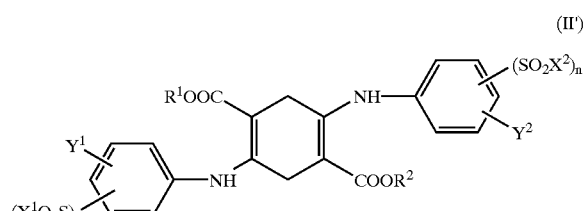

(II')

wherein
$X^1$ and $X^2$ are independently $OR^a$ or $NR^bR^c$,
$Y^1$ and $Y^2$ are independently hydrogen, halogen, $C_1$–$C_6$ alkyl, or $C_1$–$C_6$ alkoxy, $R^1$ and $R^2$ are independently hydrogen, a metal, an ammonium ion, or $C_1$–$C_{12}$ alkyl, $R^a$ is hydrogen, a metal, an ammonium ion, or $C_1$–$C_{12}$ alkyl, $R^b$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms (in which at least one such ring atom is N, O, S, or a combination thereof, and which is optionally fused to one or more additional aromatic rings), or $C_7$–$C_{16}$ aralkyl, $R^c$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, or $C_7$–$C_{16}$ aralkyl, or $R^b$ and $R^c$ together with the nitrogen atom form a heterocycle having 5 to 7 ring atoms, and m and n are independently from 0 to 3, with the provisos that (1) at least one of m or n is not 0 (preferably where both m and n are 1), (2) if $X^1$ and $X^2$ are both $NH_2$, then either (A) at least one of $Y^1$ or $Y^2$ must be halogen, $C_1$–$C_6$ alkyl, or $C_1$–$C_6$ alkoxy or (B) $Y^1$ must be different from $W^1$ and/or $Y^2$ must be different from $W^2$ (i.e., so that component (iii) is always different from component (ii)), and (3) if any one or more of components (a)(i), (a)(ii), or (a)(iii) is a 2,5-dianilino-6,13-dihydroterephthalic acid or any derivative thereof, reaction step (a) additionally comprises an oxidation step (which converts the initially formed dihydroquinacridone intermediate to the corresponding quinacridone), (iv) about 3 to about 20 parts by weight (preferably 3 to 10 parts by weight), per part of component (a)(i), of a dehydrating agent (preferably polyphosphoric acid), and (v) 0 to about 20 parts by weight, per part of component (a)(i), of a solvent;

(b) drowning the reaction mixture from step (a) by adding said reaction mixture to about 3 to about 15 parts by weight (preferably 5 to 10 parts by weight), per part of component (a)(i), of a liquid in which the quinacridone pigment composition is substantially insoluble;

(c) isolating the quinacridone pigment composition;

(d) optionally, conditioning the quinacridone pigment composition; and (e) optionally, blending (preferably dry blending) the resultant quinacridone pigment composition with one or more pigment derivatives (preferably quinacridone derivatives).

DETAILED DESCRIPTION OF THE INVENTION

Quinacridone pigments (by which is meant unsubstituted quinacridone, quinacridone derivatives, and solid solutions thereof) are prepared according to the invention by first ring-closing 2,5-dianilinoterephthalic acid precursors, including known aniline-substituted derivatives thereof, as well as their metal or amine salts or esters, by heating the 2,5-dianilinoterephthalic acid precursors in the presence of a dehydrating agent (preferably polyphosphoric acid) and a sulfonyl-containing derivative of 2,5-dianilinoterephthalic acid according to the invention or, less preferably, by thermally inducing ring closure in a high-boiling solvent in the presence of a sulfonyl-containing derivative of 2,5-dianilinoterephthalic acid according to the invention. The quinacridone-containing reaction mixture is then drowned and the resultant quinacridone pigment composition is isolated by known methods. Although generally not necessary, the resultant quinacridone pigment composition can also be subjected to additional conditioning steps to improve pigmentary properties and, if desired, blended with various additives.

Ring-closure step (a) is carried out in a dehydrating agent, particularly a strong acid such as polyphosphoric acid, acidic esters of polyphosphoric acid, or sulfuric acid. E.g., U.S. Pat. No. 4,758,665; and S. S. Labana and L. L. Labana, "Quinacridones" in *Chemical Reviews,* 67, 1–18 (1967); and W. Herbst and K. Hunger, *Industrial Organic Pigments,* 2nd ed. (New York:VCH Publishers, Inc., 1997), pages 457–458. Polyphosphoric acid having a phosphate content equivalent to about 110–120% $H_3PO_4$ is particularly preferred. When using polyphosphoric acid, the weight ratio of polyphosphoric acid to the total amount of terephthalic acid precursors, including the amount of sulfonyl-containing derivatives, is typically about 3:1 to about 10:1 (preferably 4:1 to 8:1). This method does not require solvents (other than the dehydrating agents themselves). The reaction mixture of step (a) is heated at a temperature of about 80° C. to about 145° C. (preferably 95° C. to 130° C.), preferably for about 1 to about 24 hours (more preferably for 1 to 12 hours).

It is sometimes preferable to use a 2,5-dianilino-6,13-dihydroterephthalic acid (preferably as a $C_1$–$C_6$ alkyl ester) or a derivative thereof as a starting material for any of the components (a)(i), (a)(ii), or (a)(iii) in the ring-closure reaction, after which the resultant dihydroquinacridone must be oxidized by known methods (for example, using aromatic nitro compounds, chloroanil, anthraquinone-2-sulfonic acid or a salt thereof, anthraquinone-2,7-disulfonic acid or a salt thereof, air or other oxygen-containing gases, halogens, or electrolytic oxidation) to form the corresponding quinacridones, which are collected by known methods. When using this method, dehydration is typically carried out in a solvent, preferably a high-boiling solvent or solvent mixture such as diphenyl ether/diphenyl. E.g., S. S. Labana and L. L. Labana, "Quinacridones" in *Chemical Review,* 67, 1–18 (1967) (see pages 4–5), and W. Herbst and K. Hunger, *Industrial Organic Pigments,* 2nd ed. (New York:VCH Publishers, Inc., 1997), pages 456–457. The present invention is also directed to this variant of quinacridone synthesis. It is, of course, possible to use mixtures of 2,5-dianilino-6,13-dihydroterephthalic acids and/or derivatives thereof to obtain quinacridone solid solutions.

The process of the invention can be used to prepare unsubstituted quinacridone or ring-substituted quinacridone derivatives, depending on whether the ring closure is carried out using unsubstituted 2,5-dianilinoterephthalic acid or 2,5-dianilino-6,13-dihydroterephthalic acid or a derivative thereof having one or more substituents in at least one of the two aniline rings. Although essentially any 2,5-dianilinoterephthalic or 2,5-dianilino-6,13-dihydroterephthalic acid derivatives known in the art can be used, particularly preferred 2,5-dianilinoterephthalic and or 2,5-dianilino-6,13-dihydroterephthalic acid derivatives are those in which both of the aniline moieties are substituted (typically with the same substituent) at the para position with groups such as halogen (preferably chlorine), $C_1$–$C_6$ alkyl (preferably methyl), and $C_1$–$C_6$ alkoxy (preferably methoxy). It is also possible to use derivatives of 2,5-dianilinoterephthalic acid or 2,5-dianilino-6,13-dihydroterephthalic acid in which the aniline moieties are substituted in the ortho or meta positions. The corresponding metal or amine salts (preferably alkali or alkaline earth metal salts) or esters (preferably alkyl esters) of each of the above compounds can, of course, also be used. Examples of particularly suitable 2,5-dianilinoterephthalic acid derivatives are 2,5-di(4-chloroanilino)terephthalic acid, 2,5-di(4-methylanilino)terephthalic acid, and 2,5-di(4-methoxyanilino)terephthalic acid.

It is also possible to use mixtures containing 2,5-dianilinoterephthalic acid or 2,5-dianilino-6,13-dihydroterephthalic acid and one or more derivatives thereof or mixtures containing two or more 2,5-dianilinoterephthalic or 2,5-dianilino-6,13-dihydroterephthalic acid derivatives. The use of such mixtures provides a particularly advantageous method for obtaining quinacridone solid solutions. Mixtures containing 2,5-dianilinoterephthalic acid or 2,5-dianilino-6,13-dihydroterephthalic acid or a derivative thereof in combination with a fully formed quinacridone pigment (generally in crude form) can also be used.

A critical feature of the invention is the inclusion of mixtures of small quantities of the 2,5-di(sulfamoylanilino) terephthalic acid compounds (a)(ii) in conjunction with other sulfonyl-containing 2,5-dianilinoterephthalic acid derivatives (a)(iii) during the ring-closure reaction used to prepare the quinacridone pigment composition. The compounds can be added at essentially any point during or before ring-closure step (a). Although additive precursors (a)(ii) and (a)(iii) can themselves produce highly colored quinacridone derivatives, the utility of the additive precursors is not dependent on the production of quinacridone derivatives that exhibit good pigmentary properties.

Suitable 2,5-di(sulfamoylanilino)terephthalic acid derivatives have the following formula (I)

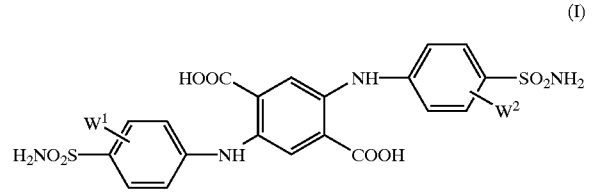

(I)

in which $W^1$ and $W^2$ can be hydrogen, halogen, $C_1$–$C_6$ alkyl, or $C_1$–$C_6$ alkoxy. A particularly preferred precursor is unsubstituted 2,5-di(sulfamoylanilino)terephthalic acid, in which $W^1$ and $W^2$ are both hydrogen, as represented by formula (Ia)

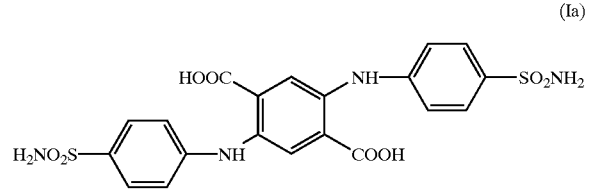

(Ia)

Analogous 2,5-di(sulfamoylanilino)-6,13-dihydroterephthalic acid derivatives of formula (I') are also suitable, particularly when using 2,5-dianilino-6,13-dihydroterephthalic acids or derivatives thereof as starting materials (a)(i) and (a)(iii). The sulfonyl-containing dihydroquinacridones that form during ring closure can be oxidized to the corresponding sulfonyl-containing quinacridones under the same conditions used to oxidize the dihydroquinacridone intermediates of the other components.

Suitable sulfonyl-containing derivatives of 2,5-dianilinoterephthalic acid have the following formula (II)

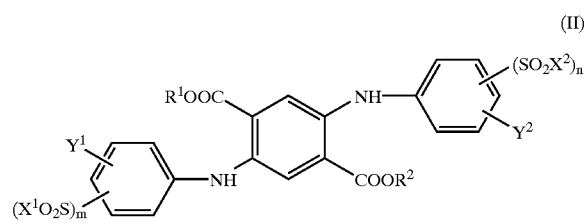

(II)

in which $X^1$ and $X^2$ can independently be OH (i.e., free sulfonic acid groups), $O^-cation^+$(i.e., salts of metals or various ammonium ions), O-alkyl (i.e., sulfonic acid alkyl esters), or $NR^bR^c$ (i.e., various sulfon-amides in which each $R^b$ can independently be hydrogen or an optionally substituted alkyl, cycloalkyl, aryl, heteroaryl, or aralkyl and each $R^c$ can independently be hydrogen or an optionally substituted alkyl, cycloalkyl, or aralkyl or in which $R^b$ and $R^c$ together with the nitrogen atom can form a heterocycle having 5 to 7 ring atoms); $Y^1$ and $Y^2$ can independently be hydrogen, halogen, alkyl, or alkoxy; and m and n can be from 0 to 3 as long as at least one of m or n is not zero. In preferred embodiments, the $Y^1$ and $Y^2$ groups are identical and all $X^1$ and $X^2$ groups are identical. However, to assure that component (a)(iii) is always different from component (a)(ii), $X^1$ and $X^2$ can both be $NH_2$ only if at least one of $Y^1$ or $Y^2$ is halogen, $C_1$–$C_6$ alkyl, or $C_1$–$C_6$ alkoxy or if $Y^1$ is different from $W^1$ and/or $Y^2$ is different from $W^2$.

Analogous sulfonyl-containing derivatives of 2,5-dianilino-6,13-dihydroterephthalic acid derivatives of formula (II') are also suitable, particularly when using 2,5-dianilino-6,13-dihydroterephthalic acids or derivatives thereof as starting materials (a)(i) and (a)(ii). The sulfonyl-containing dihydroquinacridones that form during ring closure can be oxidized to the corresponding sulfonyl-containing quinacridones under the same conditions used to oxidize the dihydroquinacridone intermediates of the other components.

As used herein, the term "$C_1$–$C_{12}$ alkyl" refers to straight or branched chain aliphatic hydrocarbon groups having from 1 to 12 carbon atoms. Examples of $C_1$–$C_{12}$ alkyl are methyl, ethyl, propyl, butyl, pentyl, hexyl, heptyl, octyl, nonyl, decyl, undecyl, dodecyl, and the isomeric forms thereof. The $C_1$–$C_{12}$ alkyl groups can also be substituted, for example, with one or more $C_1$–$C_6$ alkoxy, $C_1$–$C_6$ alkylthio, or halogen groups. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_1$–$C_6$ alkylthio" refers to analogous groups in which a sulfur atom replaces the oxygen atom. The term "$C_5$–$C_7$ cycloalkyl" refers to cycloaliphatic hydrocarbon groups having from 5 to 7 carbon atoms. Examples of $C_5$–$C_7$ cycloalkyl are cyclopentyl, cyclohexyl, and cycloheptyl. The $C_5$–$C_7$ cycloalkyl groups can also be substituted, for example, with one or more $C_1$–$C_6$ alkoxy, $C_1$–$C_6$ alkylthio, or halogen groups. The term "$C_6$–$C_{10}$ aryl" refers to phenyl and 1- or 2-naphthyl, as well as to phenyl and naphthyl groups substituted with alkyl, alkoxy, halogen, cyano, and nitro. The term "heteroaryl" refers to five- and six-membered aromatic groups in which at least one ring atom is N, O, S, or a combination thereof, and which can optionally be fused to one or more additional aromatic rings. Such heteroaryl groups are attached to the sulfonamide nitrogen atom at a ring carbon atom. Examples of heteroaryl are pyrrolyl, imidazolyl, pyrazolyl, furanyl, thiophenyl, isothiazolyl, isoxazolyl, pyridinyl, pyrazinyl, pyrimidinyl, pyridazinyl, and the like. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "heterocycle", as used to describe compounds in which $NR^bR^c$ is a heterocycle having 5 to 7 ring atoms, includes groups in which $R^b$ and $R^c$ together are linear $C_4$–$C_6$ alkylene, alkenylene, alkadienylene, or alkatrienylene groups having one or more substituents (such as alkyl, alkoxy, or halogen) and the nitrogen atom is always tertiary rather than quaternary. Suitable heterocycles also include groups in which one or more of the ring carbon atoms is replaced with N, O, or S (the maximum number of double bonds in the ring being limited, of course, to the number giving chemically reasonable heterocyclic groups). Examples of suitable heterocycles include pyrrolidinyl, pyrrolinyl, imidazolidinyl, pyrazolidinyl, pyrazolinyl, piperidinyl, piperazinyl, morpholinyl, and the like. Examples of halogen are fluorine, chlorine, bromine, and iodine.

Although it is possible to use sulfonyl-containing 2,5-dianilinoterephthalic or 2,5-dianilino-6,13-dihydroterephthalic acid derivatives containing one or more substituents in addition to the sulfonyl groups, including, for example, halogen (preferably chlorine), $C_1$–$C_6$ alkyl (preferably methyl), and $C_1$–$C_6$ alkoxy (preferably methoxy), the preferred 2,5-dianilinoterephthalic acid derivatives contain no substituents other than the sulfonyl groups. Particularly preferred 2,5-dianilinoterephthalic acid derivatives are "disulfonyl" compounds of formula (IIa)

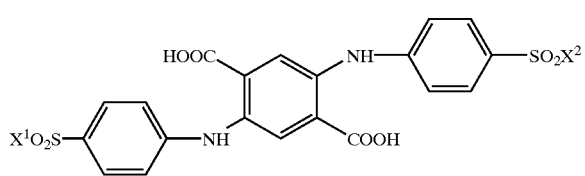

(IIa)

in which $X^1$ and $X^2$ are defined as above, except that $X^1$ and $X^2$ cannot both be $NH_2$.

Among the preferred sulfonyl-containing 2,5-dianilinoterephthalic acid derivatives are sulfonic acids (or salts thereof) having the following formula (IIb)

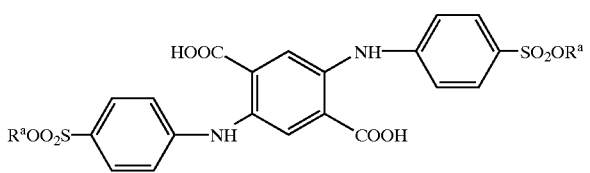

(IIb)

in which $R^a$ is defined as above. The preferred compounds of formula (IIb) are the free sulfonic acids (i.e., in which $R^a$ is hydrogen), but it is also possible to use the corresponding metal or ammonium salts. Suitable metals include alkali metals (such as lithium, sodium, and potassium), alkaline earth metals (such as magnesium, calcium, and barium), aluminum, transition metals and other heavy metals (such as nickel, iron, cobalt, manganese, copper, and tin), the polyvalent metals being used in stoichiometrically appropriate amounts (i.e., 1/k moles of a k-valent metal per mole of oxygen). Suitable ammonium cations include $NH_4^+$ and various N-alkyl, N-aryl, and/or N-aralkyl-substituted derivatives thereof. Although the strongly acidic conditions typically used for ring closure may convert such salts to the corresponding free sulfonic acids, it may nevertheless be advantageous to add the sulfonyl-containing 2,5-dianilinoterephthalic acid derivatives in salt form.

Particularly preferred sulfonyl-containing 2,5-dianilinoterephthalic acid derivatives include sulfonamides having the following formula (IIc)

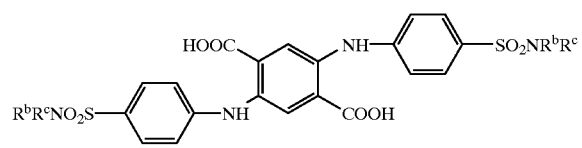

(IIc)

in which each $R^b$ is independently hydrogen, alkyl or substituted alkyl, cycloalkyl or substituted cycloalkyl, aryl, heteroaryl, or aralkyl and each $R^c$ is independently alkyl or substituted alkyl, cycloalkyl or substituted cycloalkyl, or aralkyl or, somewhat less preferably, in which $R^b$ and $R^c$ together with the nitrogen atom form a heterocycle having 5 to 7 ring atoms. Preferred compounds of formula (IIc) are those in which $R^b$ and $R^c$ are both alkyl or in which $R^b$ is alkyl, aryl, or heteroaryl and $R^c$ is hydrogen.

Although the use of strongly acidic dehydrating agents (especially polyphosphoric acid) at elevated temperatures might be expected to convert many if not all of the sulfonamide groups of sulfonamide-containing compounds (such as those of formula (IIc), as well as formula (I)) to the corresponding free sulfonic acids, it nevertheless appears to be advantageous to use sulfonamides such as those of formula (IIc) instead of the corresponding free acids, salts, or esters.

It is possible, but not necessary, to add various fully formed quinacridone derivatives, particularly sulfonyl-containing quinacridone products prepared from sulfonyl-containing 2,5-dianilinoterephthalic acid derivatives such as used in the invention, to the ring-closure step.

After ring-closure step (a) (including any necessary oxidation) is completed, the quinacridone pigment composition is precipitated (i.e., "drowned") in step (b) by adding the strongly acidic melt to a liquid in which the quinacridone pigment composition is substantially insoluble, preferably water, a water-miscible solvent (such as methanol, or other lower aliphatic alcohols), or mixtures thereof. Although it is possible to add the drowning liquid to the acidic melt (e.g., U.S. Pat. No. 3,265,699), the present invention is preferably carried out by adding the acidic melt to the solvent (compare U.S. Pat. No. 4,100,162).

Suitable drowning liquids include water and/or water-miscible organic liquids; including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

The temperature of the drowning liquid is usually between about 5° C. and about 65° C. In general, lower drown temperatures give pigments having smaller particle sizes. However, because process cycle time is also very important (because of manufacturing cost), a shorter drowning time is preferred. The presence of pigment derivatives (a)(ii) and (a)(iii), which act in part as particle growth inhibitors, allows the solvent temperature to rise during the drowning process, thus shortening the time without excessive particle size growth.

The drowned pigment composition is then isolated in step (c) using methods known in the art, such as filtration, and then dried if desired. Other collection methods known in the art, such as centrifugation, microfiltration, or even simple decantation, are also suitable.

Although generally not necessary, the crystalline pigment composition obtained in step (c) can be conditioned in an optional step (d) using methods known in the art, such as solvent treatment or milling in combination with solvent treatment. Suitable milling methods include dry-milling methods such as sand-milling, ball-milling, and the like, with or without additives, or wet-milling methods such as salt-kneading, bead-milling, and the like in water or organic solvents, with or without additives.

Tinctorial strength and transparency of the pigment composition can also be affected by solvent treatment carried out by heating a dispersion of the pigment composition, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase pigment dispersion stability, and reduce coating viscosity, such as polymeric dispersants (or surfactants). E.g., U.S. Pat. Nos. 4,455,173; 4,758,665; 4,844,742; 4,895,948; and, 4,895,949.

During or after the optional conditioning step it is possible, but generally not necessary, to use various other optional ingredients that provide improved properties. Examples of such optional ingredients include fatty acids having at least 12 carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl)-benzyl]ammonium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 20% by weight (preferably 1 to 10% by weight), based on the amount of pigment composition.

After the pigment composition has been isolated and optionally conditioned, the pigment composition can be blended (preferably by dry blending) with one or more pigment derivatives known in the art. Suitable pigment derivatives for step (e) include quinacridone derivatives, particularly known quinacridone sulfonic acids and sulfonamides and quinacridone derivatives containing other substituents (such as substituents containing phthalimide or heteroaromatic groups).

Pigment compositions prepared according to the invention characteristically exhibit deep (dark), bright, transparent masstones, along with bright, blue metallics, and blue tints, and sometimes exhibit improved rheological properties, all of which are highly desirable characteristics of quinacridone pigments, especially when used for automotive applications.

Because of their advantageous properties, the quinacridone pigment compositions prepared according to the present invention are suitable for many different pigment applications. For example, pigment compositions prepared according to the invention can be used as the colorant (or as one of two or more colorants) for very fast pigmented systems, such as mixtures with other materials, pigment formulations, paints, printing ink, colored paper, or colored macromolecular materials. The term "mixture with other materials" can be understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and if appropriate, preservatives. Examples of paints in which pigment compositions of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides: polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

Pigment compositions prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are dispersible.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Differences in hue and chroma for pigments prepared according to the Examples were measured using an Applied Color System CS-5 Chroma-Sensor (Hunt Associated Laboratories, Fairfax, Va.) and, for metallic panels, an X-Rite MA58 multi-angle spectrophotometer (X-Rite, Incorporated, Grandville, Mich.

Preparation of sulfonyl-containing 2.5-dianilinoterephthalic acid derivatives

The sulfonyl-containing derivatives of 2,5-dianilinoterephthalic acid used in the Examples were prepared as follows:

2,5-Di(4-sulfamoylanilino)terephthalic acid

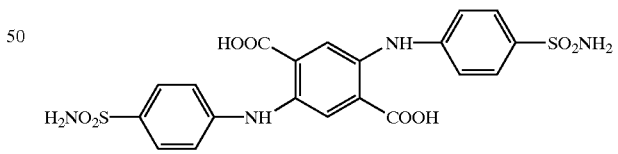

To 200 g of methanol was added with stirring 31.2 g (137 mmol) of dimethylsuccinyl succinate, 61.2 g (355 mmol) of p-sulfanilamide (Aldrich Chemical Co., Milwaukee, Wis.), and 0.7 g of concentrated sulfuric acid. The reaction mixture was heated slowly to 95 to 97° C. and maintained at that temperature for five hours. After the reaction mixture was cooled to 50° C., 34.4 g of sodium 3-nitrobenzenesulfonate, 31.8 g of water, and 100 g of 45% aqueous potassium hydroxide were slowly added with stirring. The resultant mixture was then slowly heated to 90° C. and maintained at that temperature for four hours. The reaction mixture was cooled to room temperature and added to 500 ml of water. Concentrated sulfuric acid was slowly added to produce a solid that was collected by filtration and washed with water. The wet presscake was dried in an oven to give 56.4 g (81.3% of theory) of 2,5-di(sulfamoyl-anilino)terephthalic acid. The dried product contained only one major component as determined by reverse-phase high-pressure liquid chromatography with a Waters 712 WISP system equipped with a Waters Nova C-18 cartridge using tetrahydrofuran/water as eluant.

2,5-Di[4-(N,N-diethylsulfamoyl)anilino]terephthalic acid

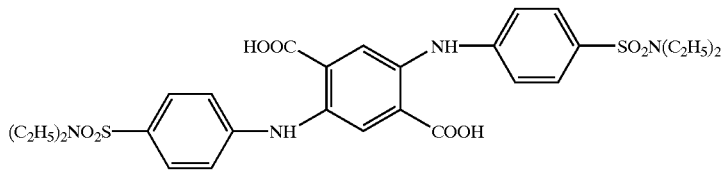

To a mixture of 56.34 g (0.77 mol) of diethylamine in 150 ml of anhydrous acetone cooled to 10° C. was added 60.0 g (0.26 mol) of acetamidobenzenesulfonyl chloride (Aldrich Chemical Co.) over a period of ten minutes. The reaction was exothermic and vigorous. After an additional 50 ml of acetone was added, the mixture was heated at reflux for two hours. The mixture, after being cooled to room temperature, was added to 1400 ml of water and stirred. The resultant solid was collected by filtration and washed with water until alkaline free. The wet presscake was added to 150 ml of water, treated with 90 g of concentrated hydrochloric acid, heated at reflux with stirring for 45 minutes, and cooled to room temperature. Concentrated ammonium hydroxide was slowly added to produce a solid that was collected by filtration and washed with water until alkaline free. The wet presscake was dried in an oven to give 51.0 g (86.6% of theory) of the intermediate compound 4-amino-(N,N-diethyl)benzenesulfonamide (or p-(N,N-diethyl)sulfanilamide).

To 150 g of methanol was added with stirring 20 g (87.6 mmol) of dimethylsuccinyl succinate, 46 g (201.6 mmol) of p-(N,N-diethyl)sulfanilamide, and 0.7 g of concentrated sulfuric acid. The reaction mixture was heated slowly to 95 to 97° C. and maintained at that temperature for five hours. After the reaction mixture was cooled to 50° C., 26 g of sodium 3-nitrobenzenesulfonate, 2 g of water, and 75 g of 45% aqueous potassium hydroxide were slowly added with stirring. The resultant mixture was then slowly heated to 90° C. and maintained at that temperature for four hours. The reaction mixture was cooled to room temperature and added to 500 ml of water. Concentrated sulfuric acid was slowly added to produce a solid that was collected by filtration and washed with water. The wet presscake was dried in an oven to give 52.2 g (96.3% of theory) of 2,5-di[4-(N,N-diethylsulfamoyl)anilino]terephthalic acid.

Examples 1–10

Dichloroquinacridone pigment compositions

Examples 1–10 describe the preparation of 2,9-dichloroquinacridone pigment compositions. Examples 1–3 are comparison examples.

Example 1 (Comparison)

Pigmentary 2,9-dichloroquinacridone was prepared in the absence of pigment derivative intermediates according to the invention.

To 720 g of polyphosphoric acid (116.5%) heated at 89° C. were added 120 g of 2,5-di(4-chloroanilino)terephthalic acid over a period of approximately 45 minutes, the temperature being maintained below 110° C. by adjustment of the addition rate. The reaction mixture was held at 113° C. for five hours and then cooled to 95° C. To this mixture was added 89.4 g of phosphoric acid (75%) dropwise over a period of 20 minutes. The resultant melt was allowed to stir for 15 minutes at 92° C. and then poured slowly into 1240 g of methanol, the temperature being maintained below reflux by adjustment of the addition rate. The slurry was allowed to cool to room temperature and stand for 16 hours. The pigment slurry was heated at reflux for one hour, cooled below 65° C., diluted with water, collected by filtration, and washed with water until free of acid. The resultant wet cake can be dried or used as is for specific applications. Here, the wet cake was dried in an oven at 60° C. to give approximately 102 g of 2,9-dichloroquinacridone as a magenta pigment.

Example 2 (Comparison)

Pigmentary 2,9-dichloroquinacridone was prepared in the presence of 1% by weight of 2,5-di(sulfamoylanilino) terephthalic acid.

To 720 g of polyphosphoric acid (116.5%) heated at 90° C. were added 1.2 g of 2,5di(sulfamoylanilino)terephthalic acid followed by 120 g of 2,5-di(4-chloroanilino) terephthalic acid over a period of approximately 45 minutes, the temperature being maintained below 110° C. by adjustment of the addition rate. The reaction mixture was held at 113° C. of five hours and then cooled to 95° C. To this mixture was added 89.4 g of phosphoric acid (75%) dropwise over a period of 20 minutes. The resultant melt was allowed to stir for 15 minutes at 92° C. and then poured slowly into 1240 g of methanol, the temperature being maintained below reflux by adjustment of the addition rate. The slurry was allowed to cool to room temperature and stand for 16 hours. The pigment slurry was heated at reflux for one hour, cooled below 65° C., diluted with water, collected by filtration, and washed with water until free of acid. The resultant wet cake can be dried or used as is for specific applications. Here, the wet cake was dried in an oven at 60° C. to give approximately 105 g of 2,9-dichloroquinacridone as a magenta pigment.

A solvent-based paint containing the comparison pigment of Example 2 and an acrylic resin system exhibited similar coloristic properties but inferior rheological properties compared to a paint prepared using the comparison pigment of Example 1.

Example 3 (Comparison)

Pigmentary 2,9-dichloroquinacridone was prepared in the presence of 10% by weight of 2,5-di[4-(N,N-diethylsulfamoyl)anilino]terephthalic acid.

To 720 g of polyphosphoric acid (116.5%) heated at 90° C. were added 12.0 g of 2,5-di[4-(N,N-diethylsulfamoyl)anilino]terephthalic acid. The mixture was stirred for five minutes, after which 120 g of 2,5-di(4-chloroanilino) terephthalic acid were added over a period of approximately 45 minutes, the temperature being maintained below 110° C. by adjustment of the addition rate. The reaction mixture was held at 113° C. for five hours and then cooled to 95° C. To this mixture was added 89.4 g of phosphoric acid (75%) dropwise over a period of 20 minutes. The resultant melt was allowed to stir for 15 minutes at 92° C. and then poured slowly into 1240 g of methanol, the temperature being maintained below reflux by adjustment of the addition rate. The slurry was allowed to cool to room temperature and stand for 16 hours. The pigment slurry was heated at reflux for one hour, cooled below 65° C., diluted with water, collected by filtration, and washed with water until free of acid. The resultant wet cake can be dried or used as is for specific applications. Here, the wet cake was dried in an oven at 60° C. to give approximately 112 g of 2,9-dichloroquinacridone as a magenta pigment.

A solvent-based paint containing the comparison pigment of Example 3 and an acrylic resin system exhibited a more transparent masstone, a much bluer and a trace brighter undertone (tint), and an increased metallic brightness and blueness with deeper flop but inferior rheological properties compared to a paint prepared using the comparison pigment of Example 1.

Example 4

Pigmentary 2,9-dichloroquinacridone was prepared according to the invention in the presence of 0.5% by weight of 2,5-di(sulfamoylanilino)terephthalic acid and 10% by weight of 2,5-di[4-(N,N-diethylsulfamoyl)anilino] terephthalic acid.

To 720 g of polyphosphoric acid (116.5%) heated at 90° C. were added 0.6 g of 2,5-di(sulfamoylanilino)terephthalic acid followed by 12.0 g of 2,5-di[4-(N,N-diethylsulfamoyl)anilino]terephthalic acid. The mixture was stirred for five minutes, after which 120 g of 2,5-di(4-chloroanilino) terephthalic acid were added over a period of approximately 45 minutes, the temperature being maintained below 110° C. by adjustment of the addition rate. The reaction mixture was held at 113° C. for five hours and then cooled to 95° C. To this mixture was added 89.4 g of phosphoric acid (75%) dropwise over a period of 20 minutes. The resultant melt was allowed to stir for 15 minutes at 92° C. and then poured slowly into 1240 g of methanol, the temperature being maintained below reflux by adjustment of the addition rate. The slurry was allowed to cool to room temperature and stand for 16 hours. The pigment slurry was heated at reflux for one hour, cooled below 65° C., diluted with water, collected by filtration, and washed with water until free of acid. The resultant wet cake can be dried or used as is for specific applications. Here, the wet cake was dried in an oven at 60° C. to give approximately 111 g of 2,9-dichloroquinacridone as a magenta pigment.

A solvent-based paint containing the pigment of Example 4 and an acrylic resin system exhibited a more transparent masstone, a much bluer and a trace duller undertone (tint), and an increased metallic brightness and blueness with deeper flop compared to a paint prepared using the comparison pigment of Example 1. The rheological properties were slightly inferior compared to a paint prepared using the comparison pigment of Example 1 but superior to paints prepared using the comparison pigments of Examples 2 and 3.

Example 5

Pigmentary 2,9-dichloroquinacridone was prepared according to the invention in the presence of 1% by weight of 2,5-di(sulfamoylanilino)terephthalic acid and 10% by weight of 2,5-di[4-(N,N-diethylsulfamoyl)anilino] terephthalic acid.

Example 4 was repeated except for using 1.2 g of 2,5-di (sulfamoylanilino)terephthalic acid.

A solvent-based paint containing the pigment of Example 5 and an acrylic resin system exhibited a more transparent masstone, a much bluer and a trace duller undertone (tint), and an increased metallic brightness and blueness with deeper flop compared to a paint prepared using the comparison pigment of Example 1. The rheological properties were slightly inferior compared to a paint prepared using the comparison pigment of Example 1 but superior to paints prepared using the comparison pigments of Examples 2 and 3.

A water-based paint containing the pigment of Example 5 and an acrylic resin system exhibited a more transparent masstone, a bluer and brighter undertone (tint), and an increased metallic brightness with deeper flop but slightly inferior rheological properties compared to a paint prepared using the comparison pigment of Example 1.

Example 6

Pigmentary 2,9-dichloroquinacridone was prepared according to the invention in the presence of 1.5% by weight of 2,5-di(sulfamoylanilino)terephthalic acid and 10% by weight of 2,5-di[4-(N,N-diethylsulfamoyl)anilino] terephthalic acid.

Example 4 was repeated except for using 1.8 g of 2,5-di (sulfamoylanilino)terephthalic acid.

A solvent-based paint containing the pigment of Example 6 and an acrylic resin system exhibited a more transparent masstone, a much bluer but slightly duller undertone (tint), and an increased metallic brightness and blueness with deeper flop compared to a paint prepared using the comparison pigment of Example 1. The rheological properties were superior to paints prepared using the comparison pigments of Examples 1, 2, and 3.

Example 7

Pigmentary 2,9-dichloroquinacridone was prepared according to the invention in the presence of 1% by weight of 2,5-di(sulfamoylanilino)terephthalic acid and 7.5% by weight of 2,5-di[4-(N,N-diethylsulfamoyl)anilino] terephthalic acid.

Example 4 was repeated except for using 1.2 g of 2,5-di (sulfamoylanilino)terephthalic acid and 9.0 g of 2,5-di[4-(N,N-diethylsulfamoyl)anilino]terephthalic acid.

A solvent-based paint containing the pigment of Example 7 and an acrylic resin system exhibited a more transparent masstone, a much bluer but weaker and slightly duller undertone (tint), and an increased metallic brightness and blueness with deeper flop compared to a paint prepared using the comparison pigment of Example 1. The rheological properties were slightly inferior compared to a paint prepared using the comparison pigment of Example 1 but superior to paints prepared using the comparison pigments of Examples 2 and 3.

Example 8

Pigmentary 2,9-dichloroquinacridone was prepared according to the invention in the presence of 1% by weight of 2,5-di(sulfamoylanilino)terephthalic acid and 5% by weight of 2,5-di[4-(N,N-diethylsulfamoyl)anilino] terephthalic acid.

Example 4 was repeated except for using 1.2 g of 2,5-di (sulfamoylanilino)terephthalic acid and 6.0 g of 2,5-di[4-(N,N-diethylsulfamoyl)anilino]terephthalic acid.

A solvent-based paint containing the pigment of Example 8 and an acrylic resin system exhibited a more transparent masstone, a much bluer undertone (tint), and an increased metallic brightness and a slightly increased metallic blueness with deeper flop compared to a paint prepared using the comparison pigment of Example 1. The rheological properties were slightly inferior compared to a paint prepared using the comparison pigment of Example 1 but slightly superior to paints prepared using the comparison pigments of Examples 2 and 3.

A water-based paint containing the pigment of Example 8 and an acrylic resin system exhibited a more transparent masstone, a bluer, stronger, and much brighter undertone (tint), and an increased metallic brightness with deeper flop and slightly superior rheological properties compared to a paint prepared using the comparison pigment of Example 1.

Example 9

Pigmentary 2,9-dichloroquinacridone was prepared according to the invention in the presence of 2% by weight of 2,5-di(sulfamoylanilino)terephthalic acid and 5% by weight of 2,5-di[4-(N,N-diethylsulfamoyl)anilino] terephthalic acid.

Example 4 was repeated except for using 2.4 g of 2,5-di (sulfamoylanilino)terephthalic acid and 6.0 g of 2,5-di[4-(N,N-diethylsulfamoyl)anilino]terephthalic acid.

A solvent-based paint containing the pigment of Example 9 and an acrylic resin system exhibited a more transparent masstone, a much bluer but slightly duller undertone (tint), and an increased metallic brightness and blueness with deeper flop compared to a paint prepared using the comparison pigment of Example 1. The rheological properties were slightly inferior compared to a paint prepared using the comparison pigment of Example 1 but slightly superior to paints prepared using the comparison pigments of Examples 2 and 3.

A water-based paint containing the pigment of Example 9 exhibited a much bluer and brighter undertone (tint) and slightly increased metallic brightness and blueness with deeper flop and slightly superior rheological properties compared to a paint prepared using the comparison pigment of Example 1.

Example 10

Pigmentary 2,9-dichloroquinacridone was prepared according to the invention in the presence of 2% by weight of 2,5-di(sulfamoylanilino)terephthalic acid and 5% by weight of 2,5-di[4-(N,N-diethylsulfamoyl)anilino] terephthalic acid and then dry blended with phthalimidomethylquinacridone.

To 900 g of polyphosphoric acid (116.5%) heated at 90° C. were added 3.0 g of 2,5-di(sulfamoylanilino)terephthalic acid followed by 7.5 g of 2,5-di[4-(N,N-diethylsulfamoyl) anilino]terephthalic acid. The mixture was stirred for five minutes, after which 150 g of 2,5-di(4-chloroanilino) terephthalic acid were added over a period of approximately 45 minutes, the temperature being maintained below 115° C. by adjustment of the addition rate. The reaction mixture was held at 113° C. for four hours and then cooled to 94° C. To this mixture was added 110.2 g of phosphoric acid (75%) dropwise over a period of 20 minutes. The resultant melt was allowed to stir for 15 minutes at 92° C. and then poured slowly into 1550 g of methanol, the temperature being maintained below reflux by adjustment of the addition rate. The slurry was allowed to cool to room temperature and stand for 16 hours. The pigment slurry was heated at reflux for one hour, cooled below 65° C., diluted with water, collected by filtration, and washed with water until free of acid. The resultant wet cake can be dried or used as is for specific applications. Here, the wet cake was dried in an oven at 60° C. to give approximately 140 g of 2,9-dichloroquinacridone as a magenta pigment. A portion of the pigment was used to prepare a blend containing 90% by weight of the pigment and 10% by weight of phthalimidomethylquinacridone.

A solvent-based paint containing the pigment of Example 10 and an acrylic resin system exhibited much improved rheological properties compared to a paint prepared using the same pigment without the phthalimidomethylquinacridone.

Examples 11–17

Dimethylquinacridone pigment compositions

Examples 11–17 describe the preparation of 2,9-dimethylquinacridone pigment composition. Examples 11 and 14 are comparison examples.

Example 11 (Comparison)

Pigmentary 2,9-dimethylquinacridone was prepared in the absence of pigment derivative intermediates according to the invention.

To 720 g of polyphosphoric acid (112%) heated at 89° C. were added 160 g of 2,5-di(4-methylanilino)terephthalic acid over a period of approximately 40 minutes, the temperature being maintained below 100° C. by adjustment of the addition rate. The reaction mixture was held at 123° C. for two hours, cooled to 93° C., and poured slowly into 1120 g of methanol, the temperature being maintained below reflux using a water bath. The pigment slurry was heated at reflux for one hour, cooled below 65° C., diluted with water, collected by filtration, and washed with water until free of acid. The resultant presscake was reslurried in water. After adjustment of the pH to 7.1, 74.2 g of 50% sodium hydroxide were added and the resultant slurry was heated at 90° C. for one hour. The slurry was cooled to 65° C., filtered, and washed with water until alkaline free, then reslurried in water. After adjustment of the pH to 9, the slurry was heated at 143° C. for two hours and allowed cooled to 45° C. After the slurry was acidified to pH 3.5, an emulsion of 4.7 g of an anionic surfactant, 69.6 g of a petroleum distillate, and 160 g of water was added, and the slurry was stirred for three hours. The resultant slurry was collected by filtration and washed with water. The wet cake can be dried or used as is for specific applications. Here, the wet cake was dried in an oven at 60° C. to give approximately 135 g of 2,9-dimethylquinacridone as a magenta pigment.

Example 12

Pigmentary 2,9-dimethylquinacridone was prepared according to the invention in the presence of 1% by weight of 2,5-di(sulfamoylanilino)terephthalic acid and 10% by weight of 2,5-di[4-(N,N-diethylsulfamoyl)anilino] terephthalic acid.

To 600 g of polyphosphoric acid (117.2%) heated at 89° C. were added 1.2 g of 2,5-di(sulfamoylanilino)terephthalic acid followed by 12.0 g of 2,5-di[4-(N,N-diethylsulfamoyl) anilino]terephthalic acid. The mixture was stirred for five minutes, after which 120 g of 2,5-di(4-methylanilino) terephthalic acid were added over a period of approximately 45 minutes, the temperature being maintained below 105° C. by adjustment of the addition rate. The reaction mixture was held at 105° C. for five hours and then cooled to 94° C. To this mixture was added 92.8 g of phosphoric acid (75%) dropwise over a period of approximately 25 minutes. The resultant melt was allowed to stir for 15 minutes at 92° C. and then poured slowly into 1120 g of methanol, the temperature being maintained below reflux using a water bath. The slurry was allowed to cool to room temperature and stand for 16 hours. The pigment slurry was heated at reflux for one hour, cooled below 65° C., diluted with water, collected by filtration, and washed with water until free of acid. The resultant presscake was reslurried in water and heated to 45° C. An emulsion of 3.5 g of an anionic surfactant, 52.3 g of a petroleum distillate, and 120 g of water was added, and the slurry was stirred for three hours.

The resultant slurry was collected by filtration and washed with water. The resultant wet cake can be dried or used as is for specific applications. Here, the wet cake was dried in an oven at 60° C. to give approximately 113 g of 2,9-dimethylquinacridone as a magenta pigment.

A solvent-based paint containing the pigment of Example 12 and an acrylic resin system exhibited a deeper and more transparent masstone, a stronger and much bluer but slightly duller undertone (tint), and an increased metallic blueness and superior rheological properties compared to a paint prepared using the comparison pigment of Example 11.

Example 13

Pigmentary 2,9-dimethylquinacridone was prepared according to the invention in the presence of 1% by weight of 2,5-di(sulfamoylanilino)terephthalic acid and 10% by weight of 2,5-di[4-(N,N-diethylsulfamoyl)anilino]terephthalic acid using a variant of the method of Example 12.

To 600 g of polyphosphoric acid (117.2%) heated at 89° C. were added 1.2 g of 2,5-di(sulfamoylanilino)terephthalic acid followed by 12.0 g of 2,5-di[4-(N,N-diethylsulfamoyl)anilino]terephthalic acid. The mixture was stirred for five minutes, after which 120 g of 2,5-di(4-methylanilino)terephthalic acid were added over a period of approximately 45 minutes, the temperature being maintained below 105° C. by adjustment of the addition rate. The reaction mixture was held at 105° C. for five hours and then cooled to 94° C. To this mixture was added 92.8 g of phosphoric acid (75%) dropwise over a period of approximately 25 minutes. The resultant melt was allowed to stir for 15 minutes at 90° C. and then poured slowly into 1120 g of methanol, the temperature being maintained below reflux using a water bath. The slurry was allowed to cool to room temperature and stand for 16 hours. After adjustment of the pH to 7.4, 74.1 g of 50% sodium hydroxide were added and the resultant slurry was heated at 90° C. for one hour. The slurry was allowed to cool to 70° C., filtered, and washed with water until alkaline free. The resultant presscake was reslurried in water and heated to 45° C. After the slurry was acidified to pH 3.4, an emulsion of 3.5 g of an anionic surfactant, 52 g of a petroleum distillate, and 120 g of water was added, and the slurry was stirred for three hours. The resultant slurry was collected by filtration and washed with water. The resultant wet cake can be dried or used as is for specific applications. Here, the wet cake was dried in an oven at 60° C. to give approximately 110 g of 2,9-dimethylquinacridone as a magenta pigment.

A solvent-based paint containing the pigment of Example 13 and an acrylic resin system exhibited a slightly less transparent masstone, a stronger and much bluer and a trace brighter undertone (tint), and an increased metallic brightness and blueness and superior rheological properties compared to a paint prepared using the comparison pigment of Example 11.

Example 14 (Comparison)

Pigmentary 2,9-dimethylquinacridone was prepared in the absence of pigment derivative intermediates according to the invention.

To 720 g of polyphosphoric acid (117%) heated at 92° C. were added 160 g of 2,5-di(4-methylanilino)terephthalic acid over a period of approximately 65 minutes, the temperature being maintained below 105° C. by adjustment of the addition rate. The reaction mixture was held at 105° C. for five hours and then cooled to 92° C. To this mixture was added 107.9 g of phosphoric acid (75%) dropwise over a period of approximately 30 minutes. The resultant melt was allowed to stir for 15 minutes at 90° C. and then poured slowly into 1120 g of methanol, the temperature being maintained below reflux using a water bath. The slurry was allowed to cool to room temperature and stand for 16 hours. The pigment slurry was heated at reflux for one hour, cooled below 65° C., diluted with water, collected by filtration, and washed with water until free of acid. The resultant presscake was reslurried in water and heated to 45° C. After the slurry was acidified to pH 2.6, an emulsion of 4.7 g of an anionic surfactant, 69.7 g of a petroleum distillate, and 160 g of water was added, and the slurry was stirred for three hours. The resultant slurry was collected by filtration and washed with water. The wet cake can be dried or used as is for specific applications. Here, the wet cake was dried in an oven at 60° C. to give approximately 143 g of 2,9-dimethylquinacridone as a magenta pigment.

Example 15

Pigmentary 2,9-dimethylquinacridone was prepared according to the invention in the presence of 1% by weight of 2,5-di(sulfamoylanilino)terephthalic acid and 5% by weight of 2,5-di[4-(N,N-diethylsulfamoyl)anilino]terephthalic acid.

To 720 g of polyphosphoric acid (117%) heated at 92° C. were added 1.6 g of 2,5-di(sulfamoylanilino)terephthalic acid followed by 8 g of 2,5-di[4-(N,N-diethylsulfamoyl)anilino]terephthalic acid. The mixture was stirred for five minutes, after which 160 g of 2,5-di(4-methylanilino)terephthalic acid were added over a period of approximately 65 minutes, the temperature being maintained below 105° C. by adjustment of the addition rate. The reaction mixture was held at 105° C. for five hours and then cooled to 92° C. To this mixture was added 105.8 g of phosphoric acid (75%) dropwise over a period of approximately 30 minutes. The resultant melt was allowed to stir for 15 minutes at 90° C. and then poured slowly into 1120 g of methanol, the temperature being maintained below reflux using a water bath. The slurry was allowed to cool to room temperature and stand for 16 hours. The pigment slurry was heated at reflux for one hour, cooled below 65° C., diluted with water, collected by filtration, and washed with water until free of acid. The resultant presscake was reslurried in water and heated to 45° C. After the slurry was acidified to pH 2.6, an emulsion of 4.7 g of an anionic surfactant, 69.6 g of a petroleum distillate, and 160 g of water was added, and the slurry was stirred for three hours. The resultant slurry was collected by filtration and washed with water. The wet cake can be dried or used as is for specific applications. Here, the wet cake was dried in an oven at 60° C. to give approximately 150 g of 2,9-dimethylquinacridone as a magenta pigment.

A solvent-based paint containing the pigment of Example 15 and an acrylic resin system exhibited a deeper and much more transparent masstone, a slightly stronger and much bluer but duller undertone (tint), and a much increased metallic brightness and blueness with deeper flop and much improved rheological properties compared to a paint prepared using the comparison pigment of Example 14.

A water-based paint containing the pigment of Example 15 and an acrylic resin system exhibited a deeper and more transparent masstone, a much stronger and much bluer undertone (tint), and a much increased metallic blueness with much deeper flop but inferior rheological properties compared to a paint prepared using the comparison pigment of Example 14.

Example 16

Pigmentary 2,9-dimethylquinacridone was prepared according to the invention in the presence of 1% by weight of 2,5-di(sulfamoylanilino)terephthalic acid and 5% by weight of 2,5-di[4-(N,N-diethylsulfamoyl)anilino] terephthalic acid using a variant of the method of Example 15.

To 720 g of polyphosphoric acid (112%) heated at 85° C. were added 1.6 g of 2,5-di(sulfamoylanilino)terephthalic acid followed by 8 g of 2,5-di[4-(N,N-diethylsulfamoyl) anilino]terephthalic acid. The mixture was stirred for five minutes, after which 160 g of 2,5-di(4-methylanilino) terephthalic acid were added over a period of approximately 65 minutes, the temperature being maintained below 110° C. by adjustment of the addition rate. The reaction mixture was held at 123° C. for two hours, cooled to 93° C., and poured slowly into 1120 g of methanol, the temperature being maintained below reflux using a water bath. The pigment slurry was heated at reflux for one hour, cooled below 65° C., diluted with water, collected by filtration, and washed with water until free of acid. The resultant presscake was reslurried in water and heated to 45° C. After the slurry was acidified to pH 2.5, an emulsion of 4.7 g of an anionic surfactant, 69.6 g of a petroleum distillate, and 160 g of water was added, and the slurry was stirred for three hours. The resultant slurry was collected by filtration and washed with water. The wet cake can be dried or used as is for specific applications. Here, the wet cake was dried in an oven at 60° C. to give approximately 151 g of 2,9-dimethylquinacridone as a magenta pigment.

A solvent-based paint containing the pigment of Example 16 and an acrylic resin system exhibited a much deeper and more transparent masstone, a stronger and much bluer but slightly duller undertone (tint), and a much greater metallic brightness and blueness with much deeper flop and superior rheological properties compared to a paint prepared using the comparison pigment of Example 14.

A water-based paint containing the pigment of Example 16 and an acrylic resin system exhibited a deeper and slightly more transparent masstone, a much stronger but slightly duller undertone (tint), and a much increased metallic brightness and slightly increased metallic yellowness with deeper flop but inferior rheological properties compared to a paint prepared using the comparison pigment of Example 14.

Example 17

Pigmentary 2,9-dimethylquinacridone was prepared according to the invention in the presence of 2% by weight of 2,5-di(sulfamoylanilino)terephthalic acid and 5% by weight of 2,5-di[4-(N,N-diethylsulfamoyl)anilino] terephthalic acid.

To 720 g of polyphosphoric acid (117%) heated at 90° C. were added 3.2 g of 2,5-di(sulfamoylanilino)terephthalic acid followed by 8 g of 2,5-di[4-(N,N-diethylsulfamoyl) anilino]terephthalic acid. The mixture was stirred for five minutes, after which 160 g of 2,5-di(4-methylanilino) terephthalic acid were added over a period of approximately 75 minutes, the temperature being maintained below 105° C. by adjustment of the addition rate. The reaction mixture was held at 105° C. for five hours and then cooled to 94° C. To this mixture was added 105.8 g of phosphoric acid (75%) dropwise over a period of approximately 30 minutes. The resultant melt was allowed to stir for 15 minutes at 90° C. and then poured slowly into 1120 g of methanol, the temperature being maintained below reflux using a water bath. The slurry was allowed to cool to room temperature and stand for 16 hours. The pigment slurry was heated at reflux for one hour, cooled below 65° C., diluted with water, collected by filtration, and washed with water until free of acid. The resultant presscake was reslurried in water and heated to 45° C. After the slurry was acidified to pH 2.3, an emulsion of 4.7 g of an anionic surfactant, 69.7 g of a petroleum distillate, and 160 g of water was added, and the slurry was stirred for three hours. The resultant slurry was collected by filtration and washed with water. The wet cake can be dried or used as is for specific applications. Here, the wet cake was dried in an oven at 60° C. to give approximately 152 g of 2,9-dimethylquinacridone as a magenta pigment.

A solvent-based paint containing the pigment of Example 17 and an acrylic resin system exhibited a much deeper and more transparent masstone, a stronger and much bluer but slightly duller undertone (tint), and a slightly increased metallic brightness and much increased metallic blueness with deeper flop and superior rheological properties compared to a paint prepared using the comparison pigment of Example 14.

A water-based paint containing the pigment of Example 17 and an acrylic resin system exhibited a deeper and more transparent masstone, a slightly stronger and much bluer but duller undertone (tint), and a much increased metallic brightness and blueness with deeper flop and equivalent rheological properties compared to a paint prepared using the comparison pigment of Example 14.

What is claimed is:

1. A process for the preparation of quinacridone pigment compositions comprising (a) heating, at a temperature of about 80° C. to about 145° C., a reaction mixture comprising
  (i) 2,5-dianilinoterephthalic acid or 2,5-dianilino-6,13-dihydroterephthalic acid or a derivative of 2,5-dianilinoterephthalic acid or 2,5-dianilino-6,13-dihydroterephthalic acid having one or more substituents other than sulfonyl groups in at least one aniline ring, a salt or ester thereof, or a mixture thereof,
  (ii) about 0.1 to about 5 percent by weight, based on component (a)(i), of a 2,5-di(sulfamoylanilino) terephthalic acid having the formula (I)

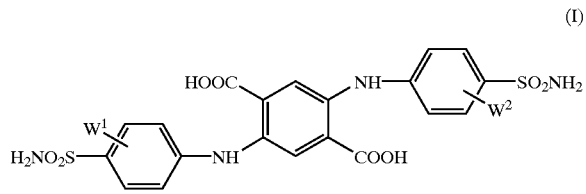

(I)

and/or a 2,5-di(sulfamoylanilino)-6,13-dihydroterephthalic acid having the formula (I')

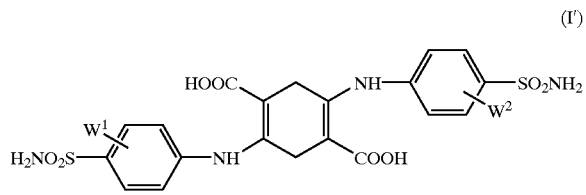

(I')

wherein $W^1$ and $W^2$ are independently hydrogen, halogen, $C_1$–$C_6$ alkyl, or $C_1$–$C_6$ alkoxy,
  (iii) about 0.1 to about 15 percent by weight, based on component (a)(i), of one or more sulfonyl-containing derivatives of 2,5-dianilinoterephthalic acid having the formula (II)

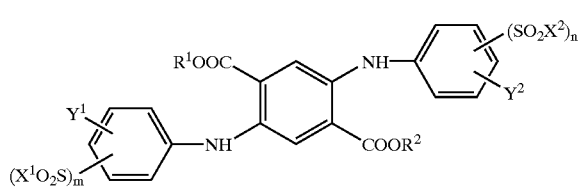

and/or one or more sulfonyl-containing derivatives of 2,5-dianilino-6,13-dihydroterephthalic acid having the formula (II')

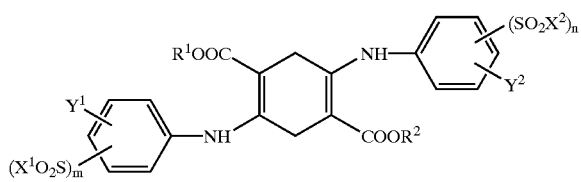

wherein
$X^1$ and $X^2$ are independently $OR^a$ or $NR^bR^c$,
$Y^1$ and $Y^2$ are independently hydrogen, halogen, $C_1$–$C_6$ alkyl, or $C_1$–$C_6$ alkoxy,
$R^1$ and $R^2$ are independently hydrogen, a metal, an ammonium ion, or $C_1$–$C_{12}$ alkyl,
$R^a$ is hydrogen, a metal, an ammonium ion, or $C_1$–$C_{12}$ alkyl,
$R^b$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms (in which at least one such ring atom is N, O, S, or a combination thereof, and which is optionally fused to one or more additional aromatic rings), or $C_7$–$C_{16}$ aralkyl,
$R^c$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, or $C_7$–$C_{16}$ aralkyl, or $R^b$ and $R^c$ together with the nitrogen atom form a heterocycle having 5 to 7 ring atoms, and m and n are independently from 0 to 3, with the provisos that
(1) at least one of m or n is not 0,
(2) if $X^1$ and $X^2$ are both $NH_2$, then either (A) at least one of $R^1$ or $R^2$ must be a metal, an ammonium ion or $C_1$–$C_{12}$ alkyl or (B) $Y^1$ must be different from $W^1$ and/or $Y^2$ must be different from $W^2$, and
(3) if any one or more of components (a)(i), (a)(ii), or (a)(iii) is a 2,5-dianilino-6,13-dihydroterephthalic acid or any derivative thereof, reaction step (a) additionally comprises an oxidation step, (iv) about 3 to about 20 parts by weight, per part of component (a)(i), of a dehydrating agent, and
(v) 0 to about 20 parts by weight, per part of component (a)(i), of a solvent;
(b) drowning the reaction mixture from step (a) by adding said reaction mixture to about 3 to about 15 parts by weight, per part of component (a)(i), of a liquid in which the quinacridone pigment composition is substantially insoluble;
(c) isolating the quinacridone pigment composition;
(d) optionally, conditioning the quinacridone pigment composition; and
(e) optionally, blending the resultant quinacridone pigment composition with one or more pigment derivatives.

2. A process according to claim 1 wherein component (a)(i) is selected from the group consisting of 2,5-dianilinoterephthalic acid, 2,5-di(4-methylanilino)terephthalic acid, 2,5-di(4-methoxyanilino)terephthalic acid, 2,5-di(4-chloroanilino)terephthalic acid, and mixtures thereof.

3. A process according to claim 1 wherein component (a)(ii) is 2,5-di(sulfamoylanilino)terephthalic acid having the formula

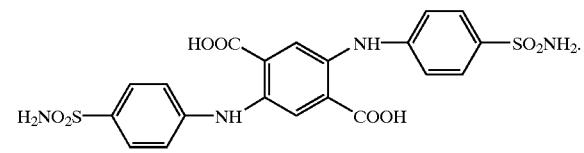

4. A process according to claim 1 wherein component (a)(iii) is a sulfonyl-containing derivative of 2,5-dianilinoterephthalic acid having the formula

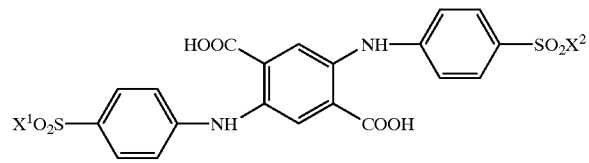

wherein $X^1$ and $X^2$ are independently $OR^a$, wherein $R^a$ is hydrogen, a metal, an ammonium ion, or $C_1$–$C_{12}$ alkyl, or $NR^bR^c$, wherein $R^b$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms in which at least one such ring atom is N, O, S, or a combination thereof, or $C_7$–$C_{16}$ aralkyl, and $R^c$ is $C_1$–$C_{12}$ alkyl or substituted $C_1$–$C_{12}$ alkyl, $C_5$–$C_7$ cycloalkyl or substituted $C_5$–$C_7$ cycloalkyl, or $C_7$–$C_{16}$ aralkyl, or wherein $R^b$ and $R^c$ together with the nitrogen atom form a heterocycle having 5 to 7 ring atoms.

5. A process according to claim 1 wherein component (a)(iii) is a sulfonyl-containing derivative of 2,5-dianilinoterephthalic acid having the formula

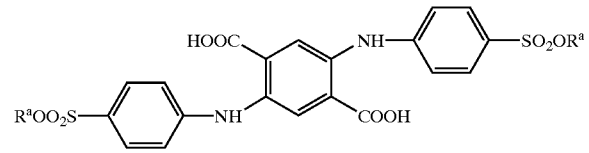

wherein $R^a$ is hydrogen, a metal, an ammonium ion, or $C_1$–$C_{12}$ alkyl.

6. A process according to claim 1 wherein component (a)(iii) is a sulfonyl-containing derivative of 2,5-dianilinoterephthalic acid having the formula

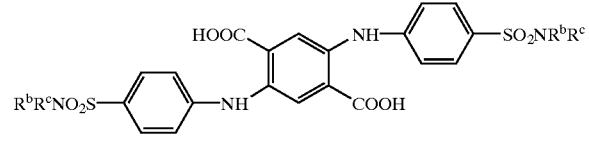

wherein each $R^b$ is independently hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms in which at least one such ring atom is N, O, S, or a combination thereof, or $C_7$–$C_{16}$ aralkyl, and each $R^c$ is independently $C_1$–$C_{12}$ alkyl, $C_5$–$C_7$ cycloalkyl, or $C_7$–$C_{16}$ aralkyl, or wherein $R^b$ and $R^c$ together with the nitrogen atom form a heterocycle having 5 to 7 ring atoms.

7. A process according to claim 1 wherein component (a)(iii) is

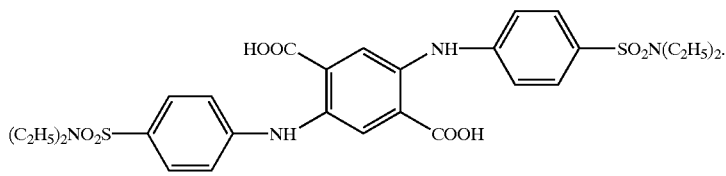

8. A process according to claim 1 wherein the reaction mixture is heated in step (a) at a temperature of 95° C. to 130° C.

9. A process according to claim 1 wherein the dehydrating agent (a)(iv) is polyphosphoric acid.

10. A process according to claim 9 wherein 3 to 10 parts by weight, relative to component (a)(i), of polyphosphoric acid is used.

11. A process according to claim 1 wherein the reaction mixture from step (a) is drowned by adding said reaction mixture to water, a lower aliphatic alcohol, or a mixture thereof.

12. A process according to claim 1 wherein the reaction mixture from step (a) is drowned by adding said reaction mixture to methanol.

13. A quinacridone pigment composition prepared by the process according to claim 1.

* * * * *